United States Patent [19]
Staros

[11] Patent Number: 5,539,591
[45] Date of Patent: Jul. 23, 1996

[54] INTEGRATED, MULTI-TRACK DRIVEN, TWO DEVICE CONTROL SYSTEM

[75] Inventor: Theodore B. Staros, Margate, Fla.

[73] Assignees: Sony Corporation, Japan; Sony Electronics, Inc., N.J.

[21] Appl. No.: 599,452

[22] Filed: Oct. 18, 1990

[51] Int. Cl.⁶ .................................................. G11B 15/18
[52] U.S. Cl. .................... 360/72.1; 360/73.02; 360/14.3; 360/13
[58] Field of Search .......................... 360/61, 69, 73.02, 360/79, 80, 27, 13, 14.1, 70, 15, 14.2, 14.3, 72.1

[56] References Cited

U.S. PATENT DOCUMENTS

| | | |
|---|---|---|
| 3,740,463 | 6/1973 | Youngstrom et al. . |
| 4,067,049 | 1/1978 | Kelly et al. .................. 360/13 |
| 4,394,694 | 7/1983 | Ninomiya et al. . |
| 4,549,236 | 11/1985 | Fujiki et al. . |
| 4,646,172 | 2/1987 | Lemelson . |
| 4,675,757 | 6/1987 | Block . |
| 4,709,277 | 11/1987 | Ninomiya et al. . |
| 4,745,495 | 5/1988 | Hashimoto ................. 360/69 |
| 4,754,342 | 6/1988 | Duffy . |
| 4,896,224 | 1/1990 | Tobe et al. . |
| 4,914,527 | 4/1990 | Asai et al. . |
| 4,918,439 | 4/1990 | Wozniak et al. ............. 340/825.69 |
| 4,935,823 | 6/1990 | Pelloni et al. . |
| 4,945,425 | 7/1990 | Hahn . |
| 4,947,271 | 8/1990 | Nakayama et al. . |
| 5,043,829 | 8/1991 | Hahn ................................ 360/15 |
| 5,055,939 | 10/1991 | Karamon et al. ............ 360/61 |

Primary Examiner—Aristotelis Psitos
Attorney, Agent, or Firm—Ronald P. Kananen

[57] ABSTRACT

The invention is generally directed to a device which receives control signals and is selectively capable of serially controlling an auxiliary device. According to one aspect of the invention, the controlling device is operable in a first mode where control signals are used to control the device itself, in a second mode where the device uses the control signals to serially control the auxiliary device and in a third mode where the control signals are used to control both the device and the auxiliary device. According to one aspect of the invention, the device may be a multi-track recorder and the auxiliary device may be a video tape recorder.

25 Claims, 2 Drawing Sheets

INTEGRATED, MULTI-TRACK DRIVEN, TWO DEVICE CONTROL SYSTEM

BACKGROUND OF THE INVENTION

1. Field of the Invention

The present invention relates generally to a multi-track audio recorder/reproducer (hereafter "multi-track recorder") designed for use in broadcasting, recording studios, video and film production environments and other applications.

2. Background of the Invention

Multi-track recorders in general are well known in the art. One such known recorder is the APR-24 made by Sony Corporation of America. It is also known to use a multi-track recorder with an auxiliary device, such as a video tape recorder (VTR), another multi-track recorder or other devices, either alone or in combination. When one or more auxiliary devices are used, multiple remote control units are often necessary to control these devices. The need for separate multiple remotes can make it difficult to conveniently control the operation of these devices and can result in costly and/or inefficient use thereof. One possible solution to this problem is the use of a multiple machine controller. However, known multiple machine controllers are too costly and often too complex for most multi-track recorder uses.

In general, a multi-track audio recorder can be used with a VTR in order to record or edit audio information on various tracks of a multi-track tape in a known manner.

In order to synchronize the position of the audio tape to be recorded or edited with video information that may already be recorded on a tape or other storage medium in the video recorder, an audio tape cue point needs to be determined. For example, if the audio information to be recorded or edited is to correspond with certain video information already recorded, the audio information should be recorded at a specific location or position on the audio tape with respect to the position or location of the recorded video information. The difference in position between these points is referred to as an offset. The position of each tape of the respective recorders may be monitored using a tape or position counter or other similar equipment all of which is well known in the art.

Sometimes an operator will determine a cue position by manipulating the tape transport mechanisms of the audio recorder and listening to the audio information. Other times a user will use the video tape to visually reference a cue point. Other times a user will use both audio and video referencing.

In the past, it has not been convenient to switch between either audio or video referencing or audio and video referencing. Furthermore, it has not been easy to determine cue points. For example, for a given cue point of a video tape, a user would normally have to calculate a corresponding cue point for the audio tape. These drawbacks, either alone or in combination, have been inefficient and time consuming.

OBJECTS AND SUMMARY OF THE INVENTION

In view of the foregoing, it is one object of the present invention to overcome these and other drawbacks of the prior art.

It is another object of the present invention to provide a device which can provide serial control of an auxiliary device.

It is another object of the present invention to provide a device which enables a single control unit to control the operations of the device and an auxiliary device.

It is another object of the present invention to provide a device which acts as a serial controller to provide both dedicated control over an auxiliary device and integrated control of the device and an auxiliary device in a tandem, coordinated operation.

It is another object of the present invention to provide a multi-track recorder which can provide dedicated control over an auxiliary device.

It is another object of the present invention to provide a multi-track recorder which can provide dedicated control over an auxiliary device and integrated control of the device and an auxiliary device in a tandem, coordinated operation.

It is another object of the present invention to provide a multi-track recorder which enables "transparent" use of position offset.

In order to accomplish these and other objects of the invention, there is provided, according to one aspect of the present invention, a multi-track recorder having a remote control unit associated therewith for providing control over at least the multi-track recorder. A local control panel on the multi-track recorder may also be provided to enable local control of the device. According to one aspect of the invention, if an auxiliary device is associated with the multi-track recorder, the auxiliary device can be serially controlled through the multi-track recorder.

According to a preferred embodiment of the invention, the multi-track recorder may be operable in a plurality of modes. In a "local mode", control signals from the control unit are used to control the multi-track recorder and the auxiliary device is either not connected or is not enabled to respond to serial communication from the multi-track recorder. In this mode, the multi-track recorder behaves according to its normal operation in a manner known in the art In a "network mode", control signals from the control unit are used to provide dedicated control of the auxiliary device and direct control of the multi-track is restricted. In a "local and network mode", the control signals from the control unit are used to provide direct control of the multi-track and, through the multi-track recorder, integrated serial control of an auxiliary device.

According to a preferred embodiment, a user can select the desired mode with switches or other mode selection apparatus which may be located on the local control panel or the remote control unit.

DETAILED DESCRIPTION OF THE PREFERRED EMBODIMENTS

Figure 1:
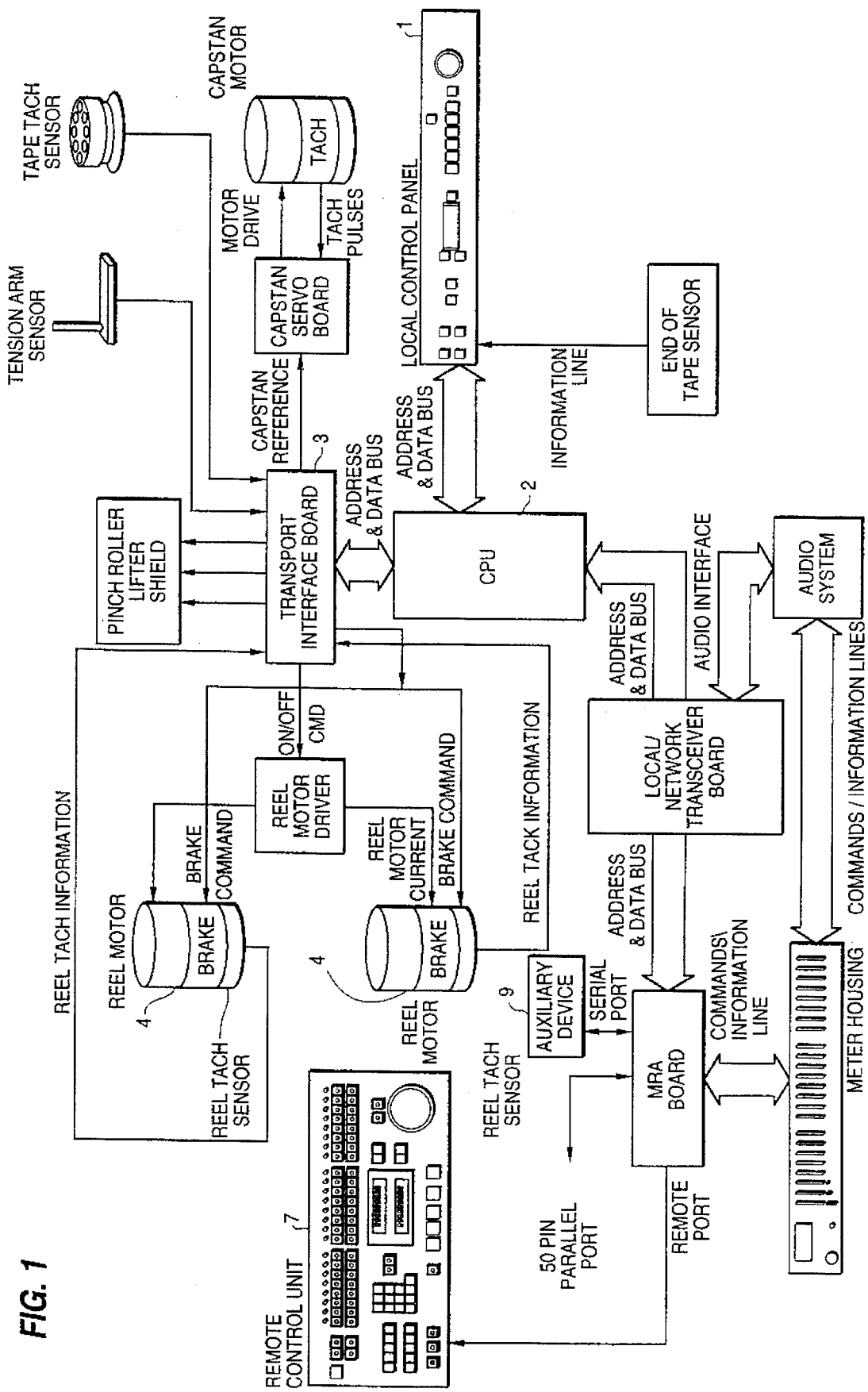
FIG. 1 is a block diagram illustrating a device according to one embodiment of the present invention.

FIG. 1 shows a block diagram of a multi-track recorder according to a preferred embodiment of the present invention. As shown in FIG. 1, there is provided a local control panel 1 for the multi-track recorder. Local control panel 1 is shown in more detail in FIG. 2 and is described below. The local control panel can be used to control various functions of the multi-track recorder including tape transport functions. In operation, the local control panel provides control signals to a CPU 2. CPU 2 is in communication with a transport interface board 3 which, in turn, is in communication with various reel motors 4 and a capstan motor 5. These elements, along with the associated elements shown in FIG. 1, are used in a known manner to provide the tape transport functions of the multi-track recorder and control other features of the recorder in a manner known in the art.

Figure 2:
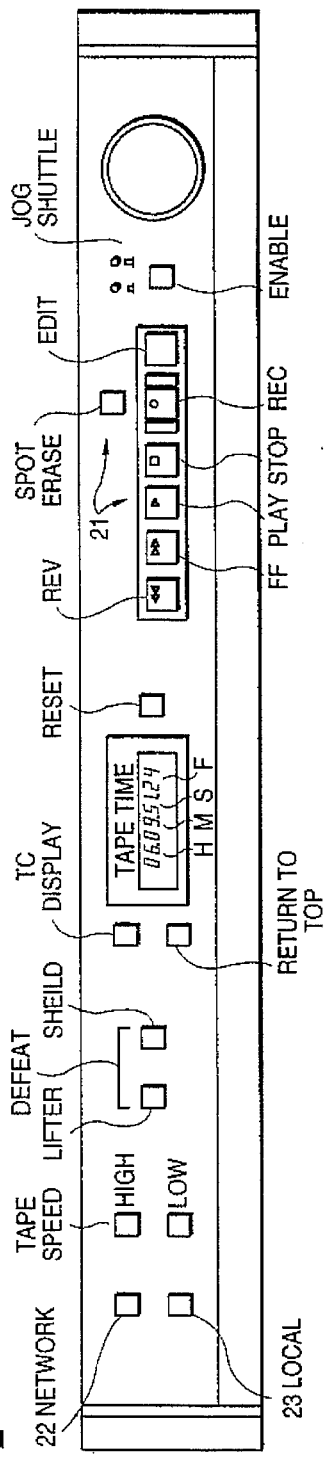
FIG. 2 is an illustration of a local control panel for a device according to one embodiment of the present invention.

More specifically, as shown in FIG. 2, the local control panel includes various function keys generally indicated by 21 including PLAY, STOP, FAST FORWARD, REWIND, RECORD, EDIT, and ERASE. Of course this control panel can be used to control other known functions. Additionally, as shown, the local control panel also includes switches for selecting between various modes of operation. According to a preferred embodiment, there are provided two separate switches, a network switch 22 and a local switch 23. In order to select the local mode, local switch 23 is activated and network switch 22 is deactivated. In order to select the network mode, network switch 22 is activated and local switch 23 is deactivated. In order to select the local and network mode, both the local and network switches 23 and 22 are activated. Of course various modifications to the switching arrangement will be apparent to one of ordinary skill in the art. Additional modes could also be implemented.

Figure 3:
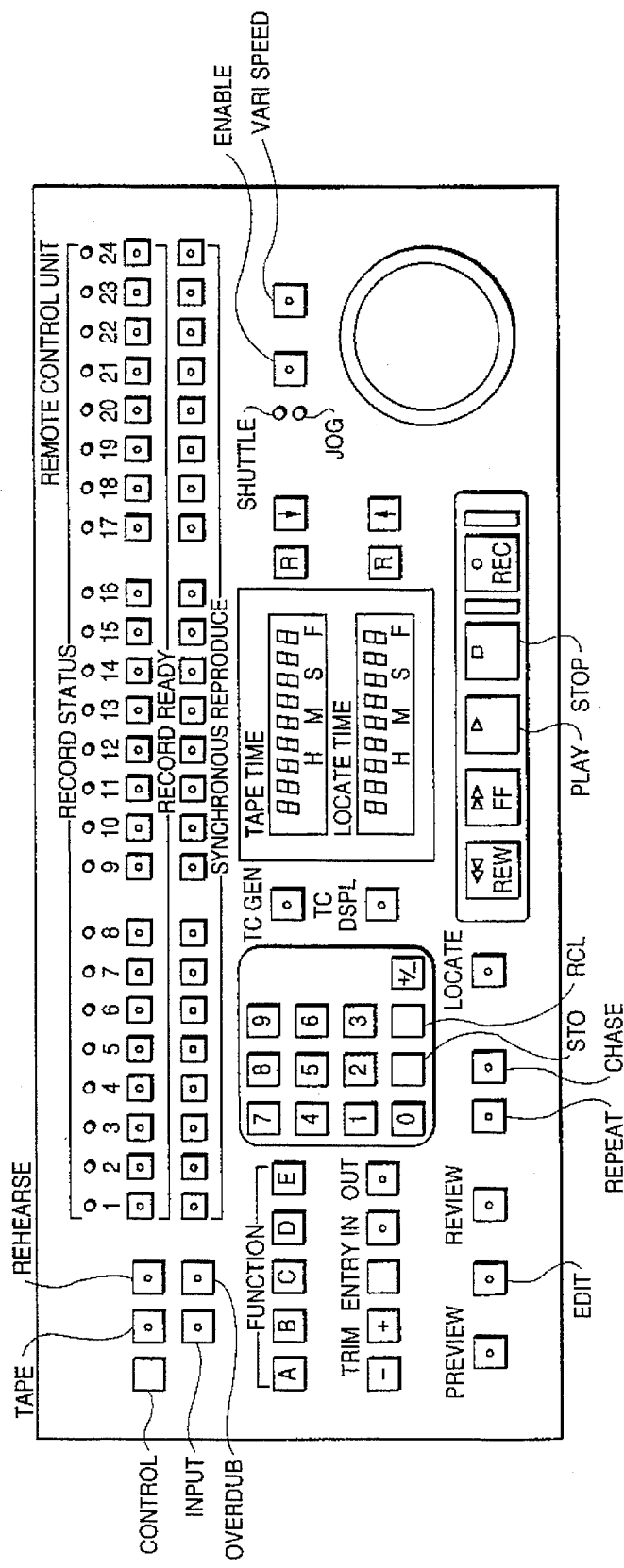
FIG. 3 is an illustration of a remote control panel for a device according to one embodiment of the present invention.

Also shown in FIG. 1 is a remote control unit 7 which can be used to remotely control the tape transport and other functions of the multi-track recorder. The panel of the remote control is further shown in FIG. 3. The various controls of the remote control are capable of controlling at least the various tape transport and other functions of the recorder which local control panel 1 is capable of controlling. Control of these functions of the multi-track recorder by remote control 7 is enabled when the multi-track recorder is in the local mode.

According to a novel aspect of the present invention, control signals received from remote control unit 7 by the multi-track recorder can be used by the multi-track recorder to serially control an auxiliary device 9 connected with the multi-track recorder, when the multi-track recorder is in either the network mode or local and network mode. In the network mode, control signals are used to primarily control auxiliary device 9, while in the local and network mode, control signals may be used to control both the multi-track recorder and auxiliary device 9 in an integrated manner.

The auxiliary device 9 may be any type of device which can be controlled by the multi-track recorder including, but not limited to a video tape recorder (VTR) or another multi-track recorder. Various combinations of devices may also be used.

In the local mode, there is essentially dedicated control of the multi-track recorder. Control in this mode (as well as in the other modes) can be implemented by using the local control panel 1 associated with the multi-track recorder or by using the remote control panel 7 associated with the multi-track recorder.

In the network mode, there is substantially dedicated control of auxiliary device 9. That is to say, control signals received by the multi-track recorder are used to provide serial control of various operations of the auxiliary device. Therefore, immediate and direct control over the auxiliary device is allowed. Transport operations are provided for at least FF, REW, STOP, PLAY, JOG, SHUTTLE, and LOCATE. Preferably however, all monitor selection controls and record ready keys retain control over the multi-track. PREVIEW, EDIT and REVIEW become inactive. If the remote unit is commanded to toggle from dedicated control (network mode) to integrated control (local and network mode), the multi-track will stop and the auxiliary device will cue to the multi-track's position adjusted by the user selected offset.

According to one embodiment of the present invention, if the external device is either not connected or is not enabled to respond to serial communication from the multi-track recorder, the remote unit will not allow the network mode to be selected.

In the local and network mode, there is integrated control and the operation of the multi-track recorder is essentially the same as its normal operation with a few distinctions. The transport motion keys (with the exception of PLAY, PREVIEW, EDIT and REVIEW) will in addition to the normal action, cause the external device to continuously locate to the current position of the multi-track. The PLAY key abandons its traditional, normal operation, and engages the CHASE operation as well as causing the auxiliary device to play. In operation, both serial control and time code signals are connected between the multi-track recorder and the auxiliary device. The multi-track issues serial commands and receives serial responses from an auxiliary device such as a VTR or another multi-track. The multi-track uses the time code signal from the auxiliary device for synchronization. The multi-track is therefore the serial controller device while the auxiliary or controlled device remains the time code master for synchronization. The time code is preferably compatible with an industry standard time code such as the SMPTE or EBU Standard.

As the auxiliary device is the time code master, the multi-track synchronizes to it. During integrated control (local and network) mode, the PREVIEW, EDIT and REVIEW will always perform as if triggered EDIT enable was set. The PREVIEW, EDIT and REVIEW in addition to their normal action, cause the auxiliary device to locate a fixed number of seconds, e.g. two seconds, prior to the (offset adjusted) IN point minus the preroll duration. Once the multi-track and auxiliary device have cued, the auxiliary device is automatically commanded to PLAY. This elicits the multi-track's trigger EDIT synchronization capabilities. Both the multi-track and the auxiliary device will stop if the remote unit is commanded to toggle to dedicated control.

Using dedicated control (network mode), the user can search, examine and capture his VTR-based visual cues directly from the multi-track remote unit. Using integrated control (local and network mode), audio cues can be examined and adjusted with full visual reference. Additionally, the calculation of cue points across synchronization offsets becomes transparent, i.e. after selection of the initial offset, no operator interaction is needed to calculate cue points. Rather, the multi-track eliminates this tack by automatically calculating the cue points based on a cue point of one device and the selected offset. Video referenced audio editing is therefore simplified as the PREVIEW, EDIT and REVIEW operations are mutually coordinated for rapid execution of audio edits.

At a minimum, the multi-track recorder provides serial control of the TRANSPORT, AUDIO, EDIT, SYNCHRONIZER, and ALIGNMENT control of the auxiliary device.

While the multi-track is particularly useful for providing serial control in an audio sweetening process, other uses are within the scope of the invention.

It will be readily apparent to one of ordinary skill in the art that the controlled device should be compatible with the controlling device. That is to say, the controlled device must be able to interpret the commands or control signals which are serially provided from the controlling device to the controlled device in order for the controlled device to be able to execute the commands. It is therefore within the scope of the invention that any "dialect" may be used as long as this criteria is met. Alternatively, or in addition thereto, a converter may be used between the devices to the extent that any conversion of the control signals from one dialect to another is necessary. According to a preferred embodiment, the Sony Nine-Pin Dialect may be used.

Although the Sony APR-24 is referenced in the background section of this application, and the invention may be implemented on this device, the invention is not so limited. Nor is the invention limited exclusively to multi-track recorders. The invention is only limited by the claims appended hereto. Various modifications and alternatives to the foregoing description of the preferred embodiment will be readily apparent to one of ordinary skill in the art.

I claim:

1. An audio recorder and reproducer, comprising:
   first means for performing tape transport functions, including a function of reproducing audio information from an audio tape;
   a control unit connected to said first tape transport functions means for generating control signals; and
   mode selection means for placing said audio recorder and reproducer in any one of a first mode, a second mode, and a third mode;
   wherein:
   (1) in said first mode, said control signals control said first tape transport functions means of said audio recorder and reproducer;
   (2) in said second mode, said control signals provide dedicated control of second means for performing tape transport functions for an auxiliary device connected to said audio recorder and reproducer; and
   (3) in said third mode, said control signals provide integrated control of both said first and second tape transport functions means.

2. An audio recorder and reproducer as set forth in claim 1, wherein said audio recorder and reproducer comprises a multi-track audio recorder and said auxiliary device comprises a video tape recorder for reproducing video information from a video tape.

3. An audio recorder and reproducer as set forth in claim 2, wherein when said multi-track audio recorder is in said third mode, a video cue point for said video information is automatically determined by said multi-track audio recorder based upon an audio cue point selected with said multi-track recorder for said audio information and an offset selected with said multi-track recorder, said offset being between said audio cue point and said video cue point.

4. An audio recorder and reproducer as set forth in claim 3, wherein when said multi-track audio recorder is in said third mode, a visual reference based on said video cue point is automatically provided for any audio cue point selected with said multi-track recorder.

5. An audio recorder and reproducer as set forth in claim 2, wherein when said multi-track recorder is in said second mode, said remote control signals provide dedicated control of said second means for performing tape transport functions of said video tape recorder, said multi-track recorder automatically providing an audio reference based upon an offset selected with said multi-track recorder and a cue point for said video tape, said offset being between said audio reference and said cue point for said video tape.

6. An audio recorder and reproducer as set forth in claim 1, further comprising offset selecting means for enabling a user to select an offset between a first cue point for said audio recorder and reproducer and a second cue point for said second means for performing tape transport functions.

7. An audio recorder and reproducer as set forth in claim 6, further comprising cue point positioning means for determining either said first cue point or said second cue point based upon said selected offset and the other of said first cue point or said second cue point and for positioning said audio tape to said first cue point and a tape for said second means for performing tape transport means to said second cue point.

8. An audio recorder and reproducer as set forth in claim 2, wherein said multi-track recorder and said video tape recorder comprise a video-follow-audio apparatus for use in audio post-production.

9. An audio recorder and reproducer as set forth in claim 1, wherein said auxiliary device comprises an audio recorder and reproducer.

10. An audio recorder and reproducer as set forth in claim 1, wherein said control unit comprises a remote control unit and said audio recorder and reproducer further comprises a local control panel which generates local control signals for controlling said tape transport functions means of said audio recorder and reproducer.

11. An audio recorder and reproducer as set forth in claim 1, wherein said audio recorder and reproducer comprises a serial controller for said auxiliary device.

12. A control system, comprising:
   (a) audio information reproducing means comprising:
      (1) first means for performing tape transport functions, including a function of reproducing audio information from an audio tape and for positioning said audio tape to any desired position;
      (2) first control means, connected to said tape transport functions means, for generating first control signals which control said first tape transport functions means; and
   (b) second information reproducing means, connected to said audio information reproducing means, for reproducing information from a second tape, said second information reproducing means comprising:
      (1) second means for performing tape transport functions, including a function of reproducing said information from said second tape and for positioning said second tape to any desired position; and
      (2) second control means, connected to said second means for performing tape transport functions, for generating second control signals for controlling said second tape transport functions means;
   wherein when said audio information reproducing means is placed in an integrated mode of operation, said first control signals control both said first tape transport functions means and said second tape transport means.

13. A control system as set forth in claim 12, wherein said audio information reproducing means comprises a multi-track audio recorder.

14. A control system as set forth in claim 13, wherein said second information reproducing means comprises a second multi-track audio recorder.

15. A control system as set forth in claim 13, wherein said second information reproducing means comprises a video tape reproducer.

16. A control system as set forth in claim 15, wherein said multi-track recorder and said video tape recorder comprise a video-follow-audio apparatus.

17. A control system as set forth in claim 12, wherein said audio information reproducing means further comprises offset selecting means for enabling a user to select an offset between a first cue point for said audio tape and a second cue point for said second tape.

18. A control system as set forth in claim 17, wherein said audio information reproducing means further comprises cue point positioning means for determining either said first cue point or said second cue point based upon said selected offset and the other of said first cue point or said second cue point and for positioning said audio tape to said first cue point and said second tape to said second cue point.

19. A control system as set forth in claim 12, wherein said audio information reproducing means comprises a serial controller for said second information reproducing means.

20. A control system, comprising:
 (a) audio information reproducing means comprising:
  (1) first means for performing tape transport functions, including a function of reproducing audio information from an audio tape and for positioning said audio tape to any desired position;
  (2) first control means, connected to said tape transport functions means, for generating first control signals which control said first tape transport functions means; and
 (b) second information reproducing means, connected to said audio information reproducing means, for reproducing information from a second tape, said second information reproducing means comprising:
  (1) second means for performing tape transport functions, including a function of reproducing said information from said second tape and for positioning said second tape to any desired position; and
  (2) second control means, connected to said second means for performing tape transport functions, for generating second control signals for controlling said second tape transport functions means;
 wherein when said audio information reproducing means is placed in a dedicated mode of operation, said first control signals control said second tape transport means.

21. A control system as set forth in claim 20, wherein said audio information reproducing means comprises a multi-track audio recorder.

22. A control system as set forth in claim 20, wherein said second information reproducing means comprises a second multi-track audio recorder.

23. A control system as set forth in claim 20, wherein said second information reproducing means comprises a video tape reproducer.

24. A control system as set forth in claim 20, wherein said audio information reproducing means comprises a serial controller for said second information reproducing means.

25. A control system, comprising:
 (a) a multi-track audio recorder comprising:
  (1) first means for performing tape transport functions, including a function of reproducing audio information from an audio tape and for positioning said audio tape to any desired position;
  (2) first control means, connected to said tape transport functions means, for generating first control signals which control said first tape transport functions means; and
  (3) offset selecting means for inputting a selected offset; and
 (b) a video tape recorder, connected to said multi-track audio recorder, for reproducing video information from a video tape, said video tape recorder comprising:
  (1) second means for performing tape transport functions, including a function of reproducing said video information from said video tape and for positioning said video tape to any desired position; and
  (2) second control means, connected to said second means for performing tape transport functions, for generating second control signals for controlling said second tape transport functions means;
 wherein said multi-track audio recorder further comprises cue point determining means for automatically determining one of an audio cue point for said audio tape or a video cue point for said video tape based upon said selected offset and the other of said audio cue point and said video cue point.

* * * * *